Jan. 6, 1953
J. M. WOLF
2,624,802
BROAD BAND COUPLER
Filed Jan. 7, 1946
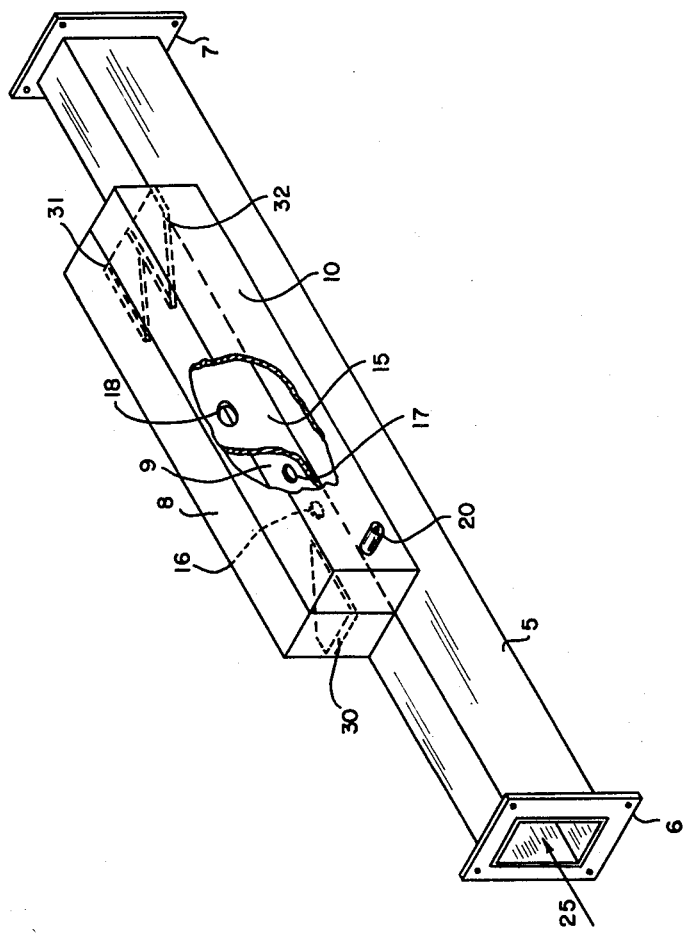
INVENTOR.
JAMES M. WOLF
BY
William D. Hall.
ATTORNEY Patented Jan. 6, 1953

2,624,802

UNITED STATES PATENT OFFICE 2,624,802

BROAD BAND COUPLER

James M. Wolf, Boston, Mass., assignor, by mesne assignments, to the United States of America as represented by the Secretary of War Application January 7, 1946, Serial No. 639,643

3 Claims. (Cl. 178—44)

This invention relates to a microwave energy coupler and more particularly to a coupler providing substantially constant coupling over an operating frequency band.

A major disadvantage of certain prior art couplers designed for use at microwave frequencies is that the magnitude of energy transfer varies considerably with frequency. Among the objects of the present invention, therefore, are: to provide a coupler which is adapted for use at any frequency within an operating frequency band; to provide a coupler adapted to transfer energy selectively from oppositely directed traveling waves of energy; to provide a coupler adapted to abstract a relatively small percentage of energy from a microwave transmission line; and to provide a coupler whose degree of coupling is relatively insensitive to frequency changes within an operating frequency band.

Further objects and advantages will become apparent from the following description, taken in connection with the single figure of the drawing illustrating an embodiment of the invention.

Referring now to the drawing, a main wave guide 5, of rectangular cross section as shown, is provided with flanges 6 and 7 adapting it for series connection in a wave guide transmission line. A secondary wave guide 8 of like cross section is secured to main wave guide 5 in such manner as to have a narrow wall 9 in common. A third length of wave guide 10, hereinafter termed the auxiliary wave guide, having the same cross-sectional dimensions as main and secondary wave guides 5 and 8, respectively, is secured to secondary wave guide 8 in such manner as to have a broad wall 15 in common. Coupling apertures 16 and 17, provided in the common wall 9 of wave guides 5 and 8, are in the described embodiment spaced longitudinally along the guides by a distance equal to a quarter guide-wavelength. In the common wall 15 lying between secondary and auxiliary guides 8 and 10, respectively, is provided a single aperture 18 located beyond the apertures 16 and 17, as shown in the drawing. A coaxial coupling 20 is provided in the outer broad wall near a closed end of auxiliary wave guide 10 for communication of coupled energy through a coaxial cable (not shown) to any desired utilization circuit. The coaxial coupling 20 has a conventional probe or loop termination within auxiliary wave guide 10, to function as an energy pick-up means.

The two apertures 16 and 17 in the common wall 9 lying between main and secondary guides 5 and 8, respectively, function to provide directional coupling in a manner well known to the art. Thus, an incident energy wave traveling through main wave guide 5 in the direction indicated by arrow 25 excites a proportional energy wave within secondary wave guide 8. This coupled energy wave travels in the same (forward) direction as the incident primary wave 25. Similarly, an oppositely directed reflected wave, traveling from right to left through the main wave guide 5, excites a secondary wave within secondary wave guide 9, also traveling from right to left, or in a forward direction referred to the reflected wave. Certain small amounts of energy are also coupled from the incident and reflected waves into the secondary wave guide 8 in backward directions referred to the exciting waves, but may generally be disregarded because of their relatively small magnitude.

Since it is generally desirable to utilize only coupled energy corresponding to an incident traveling wave 25, aperture 18 is spaced from apertures 16 and 17 in a forward direction relative to the direction of the incident wave 25. Thus, energy coupled from incident wave 25 into secondary wave guide 8 travels in a forward direction toward aperture 18 and is coupled thereby into auxiliary wave guide 10. The energy thus coupled into auxiliary wave guide 10 travels in a backward direction (as is characteristic of one-hole couplers) toward the pick-up probe (hidden from view) connected to the coaxial coupling 20. To prevent undesirable and interfering reflections, conventional broad-banded terminations 30 and 31 are provided at the closed ends of secondary wave guide 8, and a similar termination 32 is provided at the forward closed end of auxiliary wave guide 10.

It has been determined that a characteristic of two-hole couplers, such as is formed by the cooperative structure of wave guides 5 and 8 here described, is that the degree of coupling becomes closer as the frequency of operation decreases. The degree of coupling in a one-hole coupler, such as comprised by wave guides 8 and 10 in the illustrated structure, characteristically becomes looser as the operation frequency increases. In the structure here described, the degree of coupling remains substantially constant over a wide range of operating frequencies, as a result of the balancing cooperation of the two types of directional couplers.

Various modifications of the broad-banded coupler here disclosed may be made without departing from the invention. By way of example, coupling between the main and secondary guides may be provided by means of a single aperture, and between the secondary and auxiliary guides by means of two or more apertures. As a further example, in the illustrated structure or modifications thereof, energy may be abstracted at a higher level than is obtainable from the pick-up probe within the auxiliary wave guide, as by providing a pick-up probe within secondary wave guide 8.

While there has been here described a preferred embodiment of the invention, it is to be understood that various changes and modifications may be made therein without departing from the spirit of the invention.

What is claimed is:

1. A microwave energy coupler, including a rectangular main wave guide adapted for series connection in a transmission line, a secondary rectangular wave guide joined to said main wave guide by a first common wall, said common wall having two apertures therein spaced a quarter guide-wavelength along said main and secondary wave guides, an auxiliary rectangular wave guide joined to said secondary wave guide by a second common wall having a single aperture therein, and energy pickup means within said auxiliary wave guide adapted to communicate coupled energy to an external utilization circuit, whereby broad-banded coupling between said transmission line and said utilization circuit is secured.

2. A microwave energy coupler for providing constant coupling over a broad operating frequency band comprising a first wave guide adapted for connection to microwave energy transmission means, a second wave guide joined to said first wave guide by a first common wall, and a third wave guide joined to said second wave guide by a second common wall and adapted for connection to microwave energy transmission means, one of said common walls being provided with a pair of apertures therein providing coupling decreasing with increasing operating frequency, the other of said common walls being provided with a single aperture therein providing coupling increasing with increasing operating frequency.

3. A microwave energy coupler for providing constant coupling over a broad operating frequency band including input microwave energy transmission means, intermediate microwave energy transmission means joined to said input transmission means by a first common wall, output microwave energy transmission means joined to said intermediate transmission means by a second common wall, one of said common walls having coupling means therein providing an increasing coupling with increasing operating frequency, the other of said common walls having coupling means therein providing a decreasing coupling with increasing operating frequency.

JAMES M. WOLF.

REFERENCES CITED

The following references are of record in the file of this patent:

UNITED STATES PATENTS

| Number | Name | Date |
|---|---|---|
| 2,153,728 | Southworth | Apr. 11, 1939 |
| 2,413,939 | Benware | Jan. 7, 1947 |
| 2,423,390 | Korman | July 1, 1947 |
| 2,518,931 | Pound | Aug. 15, 1950 |
| 2,519,734 | Bethe | Aug. 22, 1950 |

FOREIGN PATENTS

| Number | Country | Date |
|---|---|---|
| 545,936 | Great Britain | June 18, 1942 |